(12) United States Patent
Lee et al.

(10) Patent No.: US 12,498,286 B2
(45) Date of Patent: Dec. 16, 2025

(54) GAS LEAK DETECTING DEVICE AND GAS LEAK DETECTING METHOD

(71) Applicants: HYUNDAI MOTOR COMPANY, Seoul (KR); KIA CORPORATION, Seoul (KR); FOUNDATION OF SOONGSIL UNIVERSITY-INDUSTRY COOPERATION, Seoul (KR)

(72) Inventors: Dong Sun Lee, Hwaseong-si (KR); Kyo Shik Park, Anyang-si (KR); Byung Jick Kim, Seoul (KR); Sang Wook Han, Gimpo-si (KR)

(73) Assignees: HYUNDAI MOTOR COMPANY, Seoul (KR); KIA CORPORATION, Seoul (KR); FOUNDATION SOONGSIL UNIVERSITY-INDUSTRY COOPERATION, Seoul (KR)

( * ) Notice: Subject to any disclaimer, the term of this patent is extended or adjusted under 35 U.S.C. 154(b) by 598 days.

(21) Appl. No.: 17/962,704

(22) Filed: Oct. 10, 2022

(65) Prior Publication Data
US 2023/0408362 A1     Dec. 21, 2023

(30) Foreign Application Priority Data

Jun. 16, 2022   (KR) .................. 10-2022-0073637

(51) Int. Cl.
*G01M 3/04*   (2006.01)
*G01N 21/78*  (2006.01)
*G01N 33/00*  (2006.01)

(52) U.S. Cl.
CPC ............. *G01M 3/04* (2013.01); *G01N 21/78* (2013.01); *G01N 33/005* (2013.01)

(58) Field of Classification Search
None
See application file for complete search history.

(56) References Cited

U.S. PATENT DOCUMENTS 8,015,880 B2 *   9/2011   Yamagishi ........ H01M 8/04298
                                                         73/706
11,371,656 B2 *  6/2022   Ito ......................... H01M 8/04
(Continued)

FOREIGN PATENT DOCUMENTS

JP    H06-82536 U    11/1994
JP    H10-38743 A    2/1998
(Continued)

*Primary Examiner* — Eric S. McCall
*Assistant Examiner* — Nigel H Plumb
(74) *Attorney, Agent, or Firm* — MCDONNELL BOEHNEN HULBERT & BERGHOFF LLP

(57) ABSTRACT

A gas leak detecting method includes a test article preparation operation of preparing a test article that includes a first coupling region, in which a second component is coupled to one side of a first component, and a second coupling region, in which a third component is coupled to one side of the second component, a test article arrangement operation of arranging the test article in an inner space of a body unit, and a sealing inspection operation of examining a gas discharged from the inner space and inspecting whether or not the first coupling region or the second coupling region is sealed. In the test article arrangement operation, each of the first coupling region and the second coupling region is located inside the inner space.

20 Claims, 10 Drawing Sheets

(56) References Cited

U.S. PATENT DOCUMENTS

2007/0068224 A1* 3/2007 Watanabe ............. G01M 3/226
                                                                  73/40
2020/0386369 A1* 12/2020 Ito ........................ F17C 13/023

FOREIGN PATENT DOCUMENTS

| JP | 2001-318020 A | | 11/2001 |
|----|---------------|---|---------|
| JP | 2007-78591 A | | 10/2008 |
| JP | 2009-145120 A | | 7/2009 |
| JP | 2016042026 A | * | 3/2016 |
| KR | 10-2163603 B1 | | 10/2020 |

* cited by examiner

GAS LEAK DETECTING DEVICE AND GAS LEAK DETECTING METHOD

CROSS REFERENCE TO RELATED APPLICATIONS

This application claims priority from and the benefit of Korean Patent Application No. 10-2022-0073637, filed on Jun. 16, 2022, which is hereby incorporated by reference for all purposes as if set forth herein.

TECHNICAL FIELD

Exemplary embodiments relate to a gas leak detecting device and a gas leak detecting method and, more specifically, to a gas leak detecting device and a gas leak detecting method, which may be employed to detect leakage of hydrogen.

BACKGROUND

Hydrogen is in the spotlight as an eco-friendly fuel, but hydrogen easily ignites due to its high reactivity with air, and a material absorbing hydrogen may have hydrogen brittleness. Therefore, in order to commercialize hydrogen as an energy source, safety must also be secured. Therefore, in a hydrogen storage system including a tank for storing hydrogen, hydrogen leakage in an unwanted region should be checked.

However, according to the related art, it is difficult to inspect whether hydrogen is leaking from the hydrogen storage system while the hydrogen storage system is mounted to equipment such as a vehicle, compared to inspecting whether hydrogen leaks from the hydrogen storage system in a state in which the hydrogen storage system is independently provided.

In addition, according to the related, it is difficult to simultaneously inspect regions in which hydrogen is likely to leak from the hydrogen storage system, so it takes a lot of time to inspect whether hydrogen is leaking.

SUMMARY

Exemplary embodiments of the present disclosure are to inspect whether hydrogen leaks from a hydrogen storage system even when the hydrogen storage system is mounted to another equipment.

Also, come embodiments of the present disclosure reduce the time it takes to inspect regions in a hydrogen storage system in which hydrogen is likely to leak.

A first embodiment of the present disclosure provides a gas leak detecting method including a test article preparation operation of preparing a test article that includes a first coupling region, in which a second component is coupled to one side of a first component, and a second coupling region, in which a third component is coupled to one side of the second component, a test article arrangement operation of arranging the test article in an inner space (S) of a body unit, and a sealing inspection operation of examining a gas discharged from the inner space (S) and inspecting whether or not the first coupling region or the second coupling region is sealed, wherein in the test article arrangement operation, each of the first coupling region and the second coupling region is located inside the inner space (S).

A pipe member, in which a flow path (U) is formed to communicate with the inner space (S), may be inserted into and fixed to the body unit, wherein in the sealing inspection operation, it is inspected whether or not a gas discharged from the inner space (S) and flowing in the flow path (U) is present.

The body unit may include a silicone material, wherein in the test article arrangement operation, the body unit is provided in close contact with the test article so that the first coupling region and the second coupling region are sealed from the outside.

In the test article arrangement operation, a minimum cross-sectional area (M2) of the flow path (U) may be greater than a minimum cross-sectional area (M1) of a space between the test article and an inner surface of the body unit defining the inner space (S).

In the sealing inspection operation, whether or not the first coupling region or the second coupling region is sealed may be inspected by using a reaction member which is provided on an inner surface of the pipe member defining the flow path (U) and has a color that is changed when reacting with a certain gas.

In the sealing inspection operation, whether or not the first coupling region is sealed may be inspected in a state in which the first coupling region communicates with the flow path (U) while the second coupling region is disconnected from the flow path (U).

In the sealing inspection operation, the second coupling region may be disconnected from the flow path (U) by moving a blocking member that is provided movable in a space between the test article and an inner surface of the body unit defining the inner space (S).

The test article may further include a third coupling region, in which a fourth component is coupled to one side of the first component, and a fourth coupling region, in which a fifth component is coupled to one side of the fourth component, and the inner space (S) includes a first inner space (S1) and a second inner space (S2) spaced apart from the first inner space (S1), wherein in the test article arrangement operation, the first coupling region and the second coupling region are located in the first inner space (S1), and the third coupling region and the fourth coupling region are located in the second inner space (S2).

A first pipe member, in which a first flow path (U1) is formed to communicate with the first inner space (S1), and a second pipe member, in which a second flow path (U2) is formed to communicate with the second inner space (S2), may be inserted into and coupled to the body unit, wherein in the sealing inspection operation, it is inspected whether or not a gas discharged from the first inner space (S1) and flowing in the first flow path (U1) is present, and it is inspected whether or not a gas discharged from the second inner space (S2) and flowing in the second flow path (U2) is present.

A second embodiment of the present disclosure provides a gas leak detecting device including: a test article to be inspected for leakage of a gas, the test article including a first coupling region in which a second component is coupled to one side of a first component; a body unit in which an inner space (S) is formed to accommodate the test article; and a measurement member configured to measure the gas, wherein the first coupling region is located in the inner space (S).

The gas leak detecting device may further include a pipe member which is inserted into the body unit, has the flow path U communicating with the inner space S, and protrudes from the body unit, wherein the measurement member is connected to the pipe member.

The test article further may include a second coupling region in which a third component is coupled to one side of the second component.

The gas leak detecting device may further include a reaction member which is provided on an inner surface of the pipe member defining the flow path (U) and has a color that is changed when reacting with a certain gas.

The gas leak detecting device may further include a blocking member which is provided in a space between the test article and an inner surface of the body unit defining the inner space S of the body unit, wherein the blocking member is provided movable in a space between the first coupling region and the second coupling region.

The blocking member may include a convex region having a shape that is convex outward, and a concave region which is provided on the opposite side from the convex region and has a shape that is concave toward the convex region.

The blocking member may be provided such that the direction, in which the convex region faces the concave region, is parallel to the direction, in which the first coupling region is spaced apart from the second coupling region.

The gas leak detecting device may further include a moving member which has one side fixed to the blocking member and protrudes outward from the blocking member.

The test article may further include a third coupling region, in which a fourth component is coupled to one side of the first component, and a fourth coupling region, in which a fifth component is coupled to one side of the fourth component, and the inner space (S) may include a first inner space (S1) and a second space (S2) spaced apart from the first space (S1), wherein the first coupling region and the second coupling region are located in the first inner space (S1), and the third coupling region and the fourth coupling region are located in the second inner space (S2).

The pipe member may include a first pipe member in which a first flow path (U1) is formed to communicate with the first inner space (S1), and a second pipe member in which a second flow path (U2) is formed to communicate with the second inner space (S2).

The gas leak detecting device may further include a connection pipe member which has one side connected to the first pipe member and the second pipe member and the other side connected to the measure member.

The reaction member may include a first reaction member provided on an inner surface of the first pipe member, and a second reaction member provided on an inner surface of the second pipe member.

The body unit may further include an inner protrusion which is provided on an inner surface thereof and protrudes inward, wherein the inner protrusion is provided such that the blocking member interferes with the inner protrusion when the blocking member moves downward a certain distance.

BRIEF DESCRIPTION OF THE FIGURES

The accompanying drawings, which are included to provide a further understanding of the disclosure and are incorporated in and constitute a part of this specification, illustrate embodiments of the disclosure, and together with the description serve to explain the principles of the disclosure.

DETAILED DESCRIPTION

Hereinafter, a gas leak detecting device and a gas leak detecting method will be described with reference to the drawings.

The gas leak detecting device and the gas leak detecting method according to the present disclosure may be used to detect leakage of a hydrogen gas. In one example, the gas leak detecting device and the gas leak detecting method according to the present disclosure may be used to detect whether a hydrogen gas leaks inside a hydrogen storage system provided in a vehicle that travels using hydrogen as a fuel.

Gas Leak Detecting Device

Figure 1:
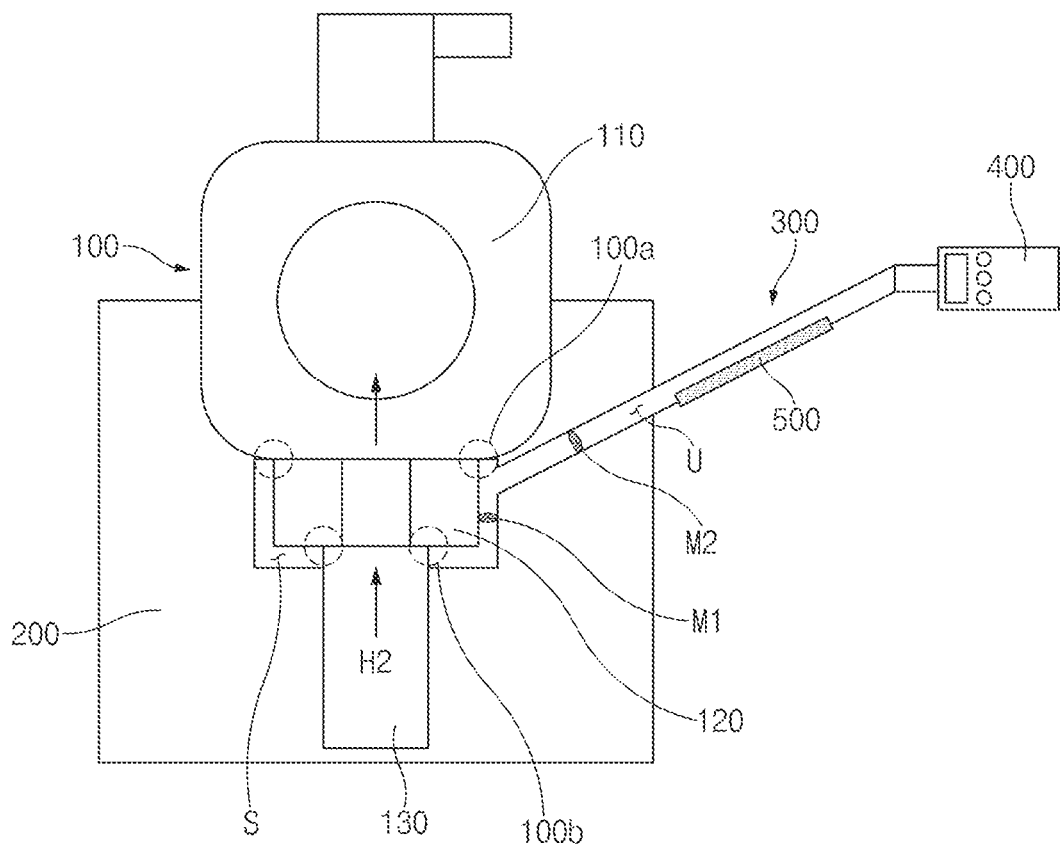
FIG. 1 is a view illustrating a gas leak detecting device according to a first embodiment of the present disclosure.

FIG. 1 is a view illustrating a gas leak detecting device according to a first embodiment of the present disclosure.

Referring to FIG. 1, the gas leak detecting device 10 according to the present disclosure may include, as an article to be inspected (hereinafter, referred to as a 'test article'), a first component 110, a second component 120, and a third component 130.

The first to third components 110, 120, and 130 may be provided separately from each other. Thus, the first component 110 may be coupled to the second component 120, and the second component 120 may be coupled to the third component 130. More specifically, the second component 120 may be coupled to one side of the first component 110 to form a first coupling region 100a, and the third component 130 may be coupled to one side of the second component 120 to form a second coupling region 100b. In one example, the first to third components 110, 120, and 130 may be subordinate components of a valve coupled to a hydrogen storage tank. Meanwhile, the gas leak detecting device 10 according to the present disclosure may be to inspect whether a gas leaks from a test article 100, but for convenience of description, the test article 100 will be described as belonging to components of the gas leak detecting device 10.

Meanwhile, the gas leak detecting device 10 may further include a body unit 200 in which an inner space S is formed to accommodate the test article 100. More specifically, as illustrated in FIG. 1, the test article 100 may be inserted into the inner space S of the body unit 200. When a gas leaks from the test article 100, the leaking gas may flow in the inner space S.

More specifically, when the test article 100 is inserted into the inner space S of the body unit 200, the inner space S may be sealed from the outside. The body unit 200 may be in close contact with the test article 100 so that the inner space S is sealed from the outside of the body unit 200. In one example, the body unit 200 may include a silicone material. In this case, the body unit 200 may be effectively brought into close contact with the test article 100, and thus, the inner space S may be effectively sealed from the outside. However, the material of the body unit 200 is not limited to the silicone, and various materials may be used as long as they effectively seal the inner space S from the outside. For example, in order for the body unit 200 to be effectively brought into close contact with the test article 100, the body unit 200 may include a material having Young's modulus less than about 5 GPa.

Also, the gas leak detecting device 10 may further include a pipe member 300 which is coupled to the body unit 200, has a flow path U communicating with the inner space S, and protrudes outward from the body unit 200. Therefore, when a gas inside the test article 100 leaks via the first coupling region 100a and the second coupling region 100b, the gas may flow in the flow path U via the inner space S.

Continuing to refer to FIG. 1, the gas leak detecting device 10 may further include a measurement member 400 which is connected to the pipe member 300 and measures the gas received from the flow path U. In one example, the measurement member 400 may be configured to measure whether a hydrogen gas is present or not.

The gas leak detecting device 10 according to the present disclosure may be to inspect whether or not a gas leaks from regions in which separately formed components are coupled to each other. More specifically, the gas leak detecting device 10 may be used to inspect whether or not a gas leaks from the first coupling region 100a formed by coupling the first component 110 to the second component 120 and the second coupling region 100b formed by coupling the second component 120 to the third component 130. Thus, according to the present disclosure, it is possible to simultaneously detect whether or not gases are leaking from a plurality of regions.

To this end, as illustrated in FIG. 1 according to the present disclosure, the first coupling region 100a and the second coupling region 100b are located together in the inner space S of the body unit 200. That is, according to the present disclosure, the first coupling region 100a and the second coupling region 100b are located together in the inner space S, and thus, it is possible to simultaneously detect whether a gas leaks from the first coupling region 100a and whether a gas leaks from the second coupling region 100b.

Continuing to refer to FIG. 1, the gas leak detecting device 10 according to the present disclosure may further include a reaction member 500 which is provided on an inner surface of the pipe member 300 defining the flow path (U) and has a color that is changed when reacting with a certain gas. More specifically, the reaction member 500 may have a color that is changed due to the reaction with a gas that leaks from the first coupling region 100a and the second coupling region 100b. As described above, the gas may be a hydrogen gas. In one example, the reaction member 500 may be a thin film member of which a color is changed when reacting with a certain gas.

Figure 2:
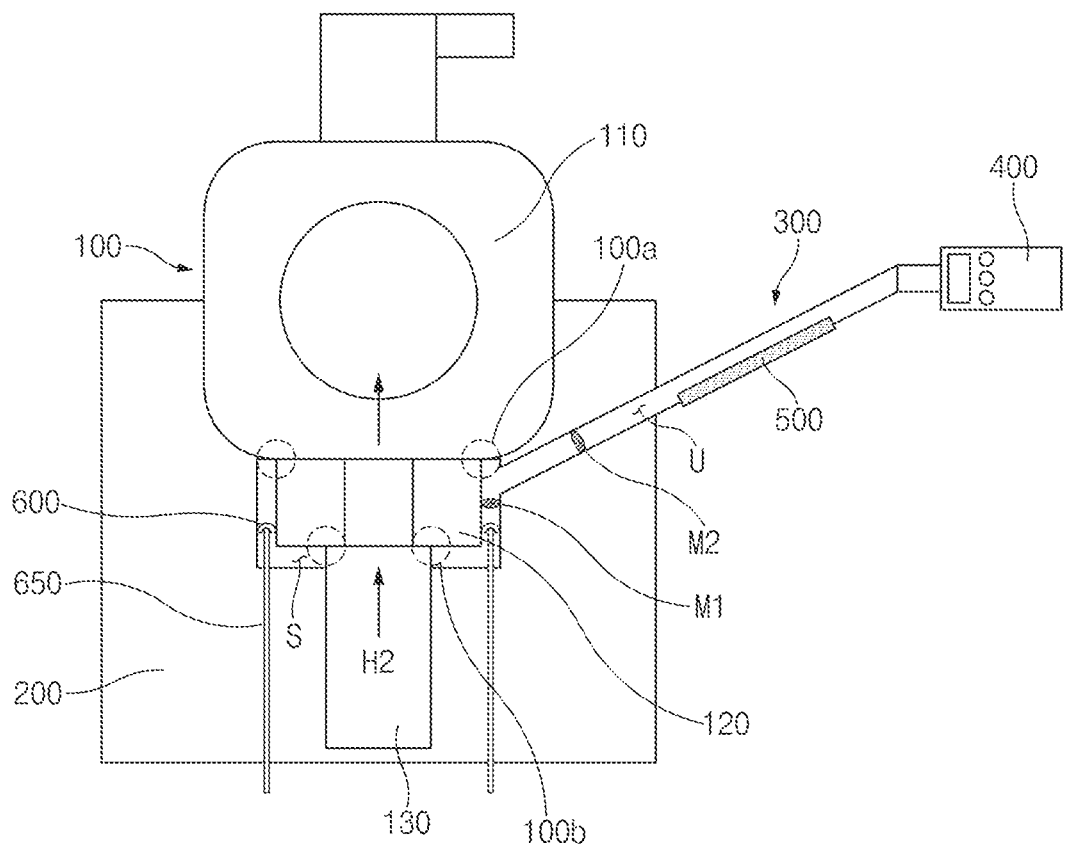
FIG. 2 is a view illustrating a state in which a blocking member disconnects a flow path from a second coupling region in a gas leak detecting device according to a second embodiment of the present disclosure.
Figure 3:
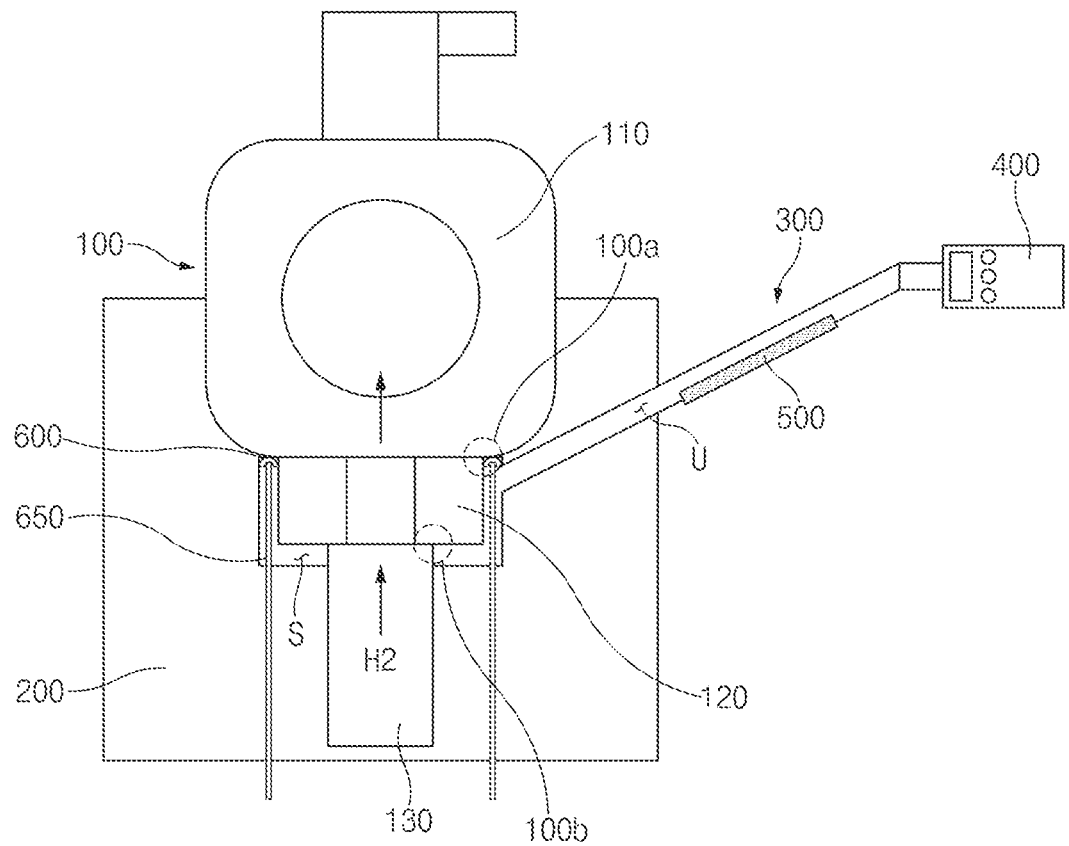
FIG. 3 is a view illustrating a state in which the blocking member disconnects the flow path from a first coupling region in the gas leak detecting device according to the second embodiment of the present disclosure.
Figure 4:
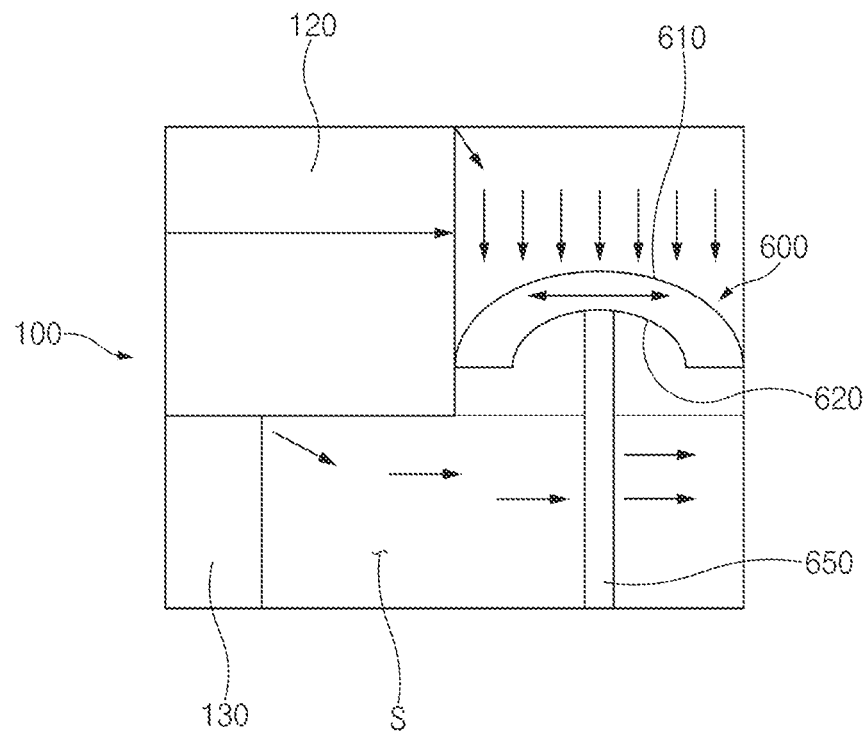
FIG. 4 is an enlarged view illustrating a blocking member and peripheral regions thereof provided in the gas leak detecting device according to the present disclosure.
Figure 5:
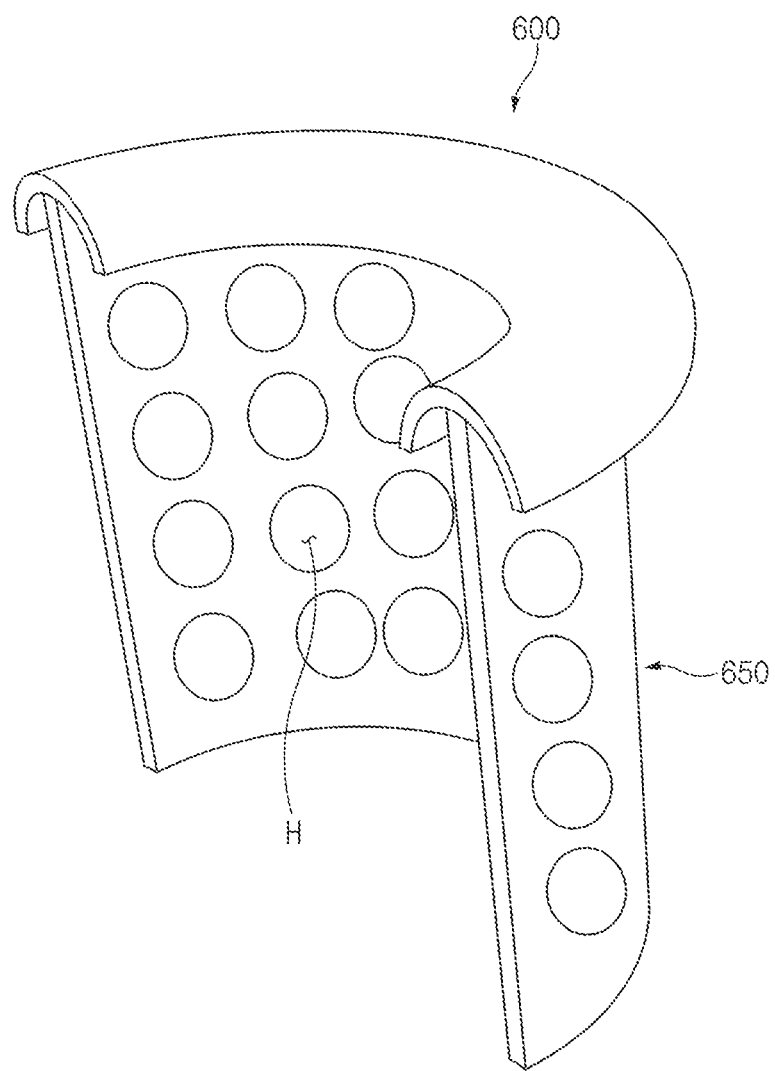
FIG. 5 is a perspective view illustrating the blocking member and a moving member provided in the gas leak detecting device according to the present disclosure.

FIG. 2 is a view illustrating a state in which a blocking member disconnects a flow path from a second coupling region in a gas leak detecting device according to a second embodiment of the present disclosure, and FIG. 3 is a view illustrating a state in which a blocking member disconnects the flow path from a first coupling region in the gas leak detecting device according to the second embodiment of the present disclosure. FIG. 4 is an enlarged view illustrating a blocking member and peripheral regions thereof provided in the gas leak detecting device according to the present disclosure, and FIG. 5 is a perspective view illustrating the blocking member and a moving member provided in the gas leak detecting device according to the present disclosure.

The content described above with respect to the first embodiment of the present disclosure may also be applied, in the same manner, to the second embodiment of the present disclosure. However, a gas leak detecting device 10 according to the second embodiment of the present disclosure is different from the gas leak detecting device 10 according to the first embodiment of the present disclosure in that the second embodiment further includes a blocking member 600.

More specifically, according to the second embodiment of the present disclosure as illustrated in FIGS. 2 and 3, the gas leak detecting device 10 may further include a blocking member 600 that is provided in a space between a test article 100 and the inner surface of a body unit 200 defining an inner space S of the body unit 200.

According to the second embodiment of the present disclosure, the blocking member 600 may be configured to selectively detect whether a gas leaks from a first coupling region 100a and whether a gas leaks from a second coupling region 100b as described above. More specifically, one side of the blocking member 600 may be provided in close contact with a second component 120, and the other end of the blocking member 600 may be provided in close contact with the inner surface of the body unit 200 defining the inner space S. Also, the blocking member 600 may be provided movable between a space between the first coupling region 100a and the second coupling region 100b. FIGS. 2 to 4 illustrate states in which one end of the blocking member 600 in the left-right direction is in close contact with the second component 120, the other end of the blocking member 600 in the left-right direction is in close contact with the inner surface of the body unit 200, and the blocking member 600 is provided movable in the up-down direction.

In one example, according to the second embodiment of the present disclosure, the blocking member 600 may be provided such that the shape thereof may be reversibly deformed when pressure is applied thereto in a direction crossing the direction in which the blocking member 600 moves. More specifically, referring to FIG. 4, the blocking member 600 may include a convex region 610 having a shape convex outward and a concave region 620 which is provided on the opposite side from the convex region 610 and has a shape recessed toward the convex region 610. Also, in the blocking member 600, the direction (the up-down direction with respect to FIGS. 2 to 4), in which the convex region 610 faces the concave region 620, may be parallel to the direction (the up-down direction with respect to FIGS. 2 to 4), in which the first coupling region 100*a* is spaced apart from the second coupling region 100*b*. FIG. 4 illustrates, as one example, a state in which the convex region 610 is formed in the upper region of the blocking member 600, and the concave region 620 is formed in the lower region of the blocking member 600. However, unlike the above, the convex region 610 may be formed in the lower region of the blocking member 600, and the concave region 620 may be formed in the upper region of the blocking member 600. The blocking member 600 described above may be understood as having an approximately semicircular or U-shaped cross-section.

In the case where the blocking member 600 includes the convex region 610 and the concave region 620 as described above, when pressure is applied from the body unit 200 and the test article 100 to the blocking member 600, the shape of the blocking member 600 may be changed in response to the pressure. Thus, adhesion between the blocking member 600 and the test article 100 and adhesion between the blocking member 600 and the inner surface of the body unit 200 may be enhanced. Furthermore, even if a gap between the test article 100 and the inner surface of the body unit 200 is changed, the adhesion between the blocking member 600 and the test article 100 and the adhesion between the blocking member 600 and the inner surface of the body unit 200 may be secured by using the same blocking member 600.

Continuing to refer to FIGS. 2, 3, and 5, the gas leak detecting device 10 according to the second embodiment of the present disclosure may further include a moving member 650 which has one side fixed to the blocking member 600 and protrudes outward from the blocking member 600. The moving member 650 may be configured to enable a user to move the blocking member 600. In FIGS. 2 and 3, the moving member 650 may extend downward from the blocking member 600 and protrude outward from the body unit 200.

In one example, as illustrated in FIG. 5, one or more through-holes H may be formed in the moving member 650. The one or more through-holes H formed in the moving member 650 may provide paths through which a fluid flows. In particular, referring to FIGS. 4 and 5, the through-holes H formed in the moving member 650 may provide paths that enable a gas present below the blocking member 600 to flow while passing through the moving member 650. Meanwhile, the moving member 650 may be moved by operation of a user or may be moved by a separate driving unit.

Figure 6:
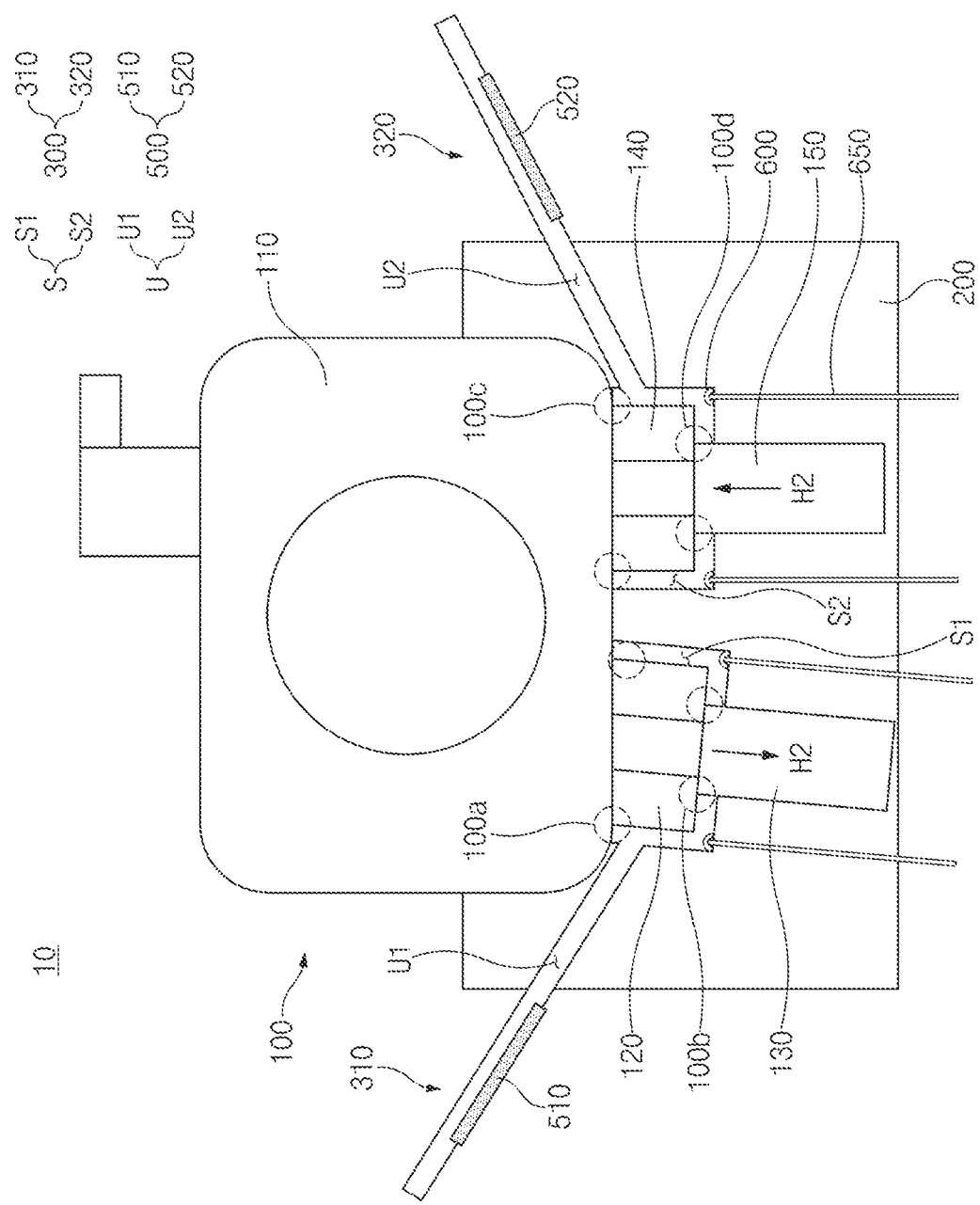
FIG. 6 is a view illustrating a gas leak detecting device according to a third embodiment of the present disclosure.
Figure 7:
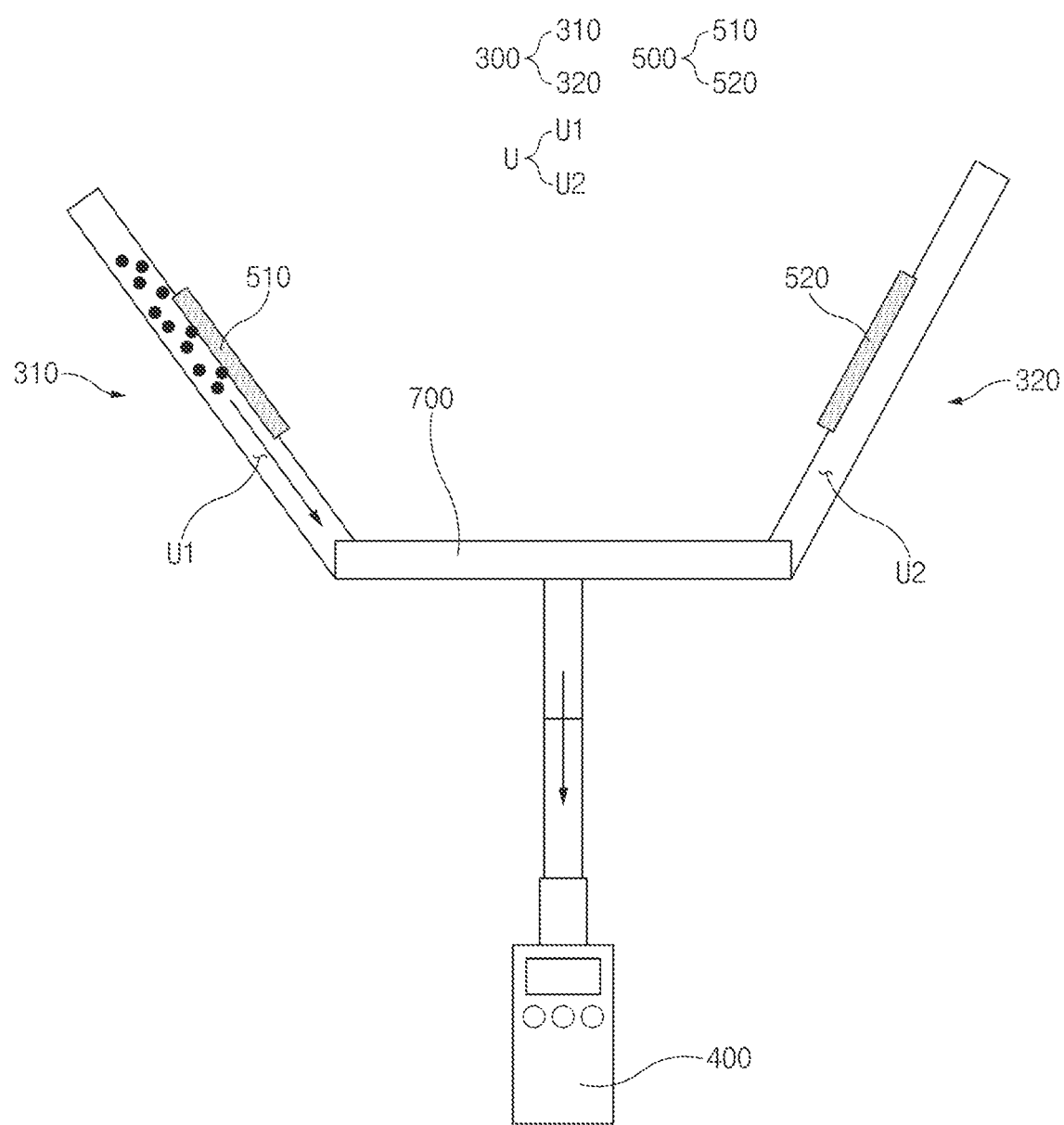
FIG. 7 is a view illustrating a state in which a connection pipe member and pipe members provided in the gas leak detecting device according to the third embodiment of the present disclosure are coupled to each other.

FIG. 6 is a view illustrating a gas leak detecting device according to a third embodiment of the present disclosure, and FIG. 7 is a view illustrating a state in which a connection pipe member and pipe members provided in the gas leak detecting device according to the third embodiment of the present disclosure are coupled to each other.

The content described above with respect to the first embodiment and the second embodiment of the present disclosure may also be applied, in the same manner, to the third embodiment of the present disclosure. However, a gas leak detecting device 10 according to the third embodiment of the present disclosure is different from the gas leak detecting devices 10 according to the first embodiment and the second embodiment of the present disclosure in that the third embodiment further includes a fourth component 140, a fifth component 150, a third coupling region 100*c*, and a fourth coupling region 100*d*.

More specifically, according to the third embodiment of the present disclosure, the test article 100 may further include the fourth component 140 coupled to one side of the first component 110 and the fifth component 150 coupled to one side of the fourth component 140, in addition to the first to third components 110, 120, and 130. Thus, the test article 100 may further include the third coupling region 100*c*, in which the fourth component 140 is coupled to the one side of the first component 110, and the fourth coupling region 100*d*, in which the fifth component 150 is coupled to the one side of the fourth component 140.

Moreover, according to the third embodiment of the present disclosure, the inner space S may also be divided into a plurality of regions spaced apart from each other. More specifically, as illustrated in FIGS. 6 and 7, the inner space S of the body unit 200 may include a first inner space S1 and a second inner space S2 spaced apart from the first inner space S1. Here, the first coupling region 100*a* and the second coupling region 100*b* may be located in the first inner space S1, and the third coupling region 100*c* and the fourth coupling region 100*d* may be located in the second inner space S2. Thus, according to the third embodiment of the present disclosure, gas leak inspections may be simultaneously performed on a greater number of coupling regions.

Also, according to the third embodiment of the present disclosure, the blocking member 600 is provided between the test article 100 and the inner surface of the body unit 200 defining the first inner space S1 and may be provided movable in a space between the first coupling region 100*a* and the second coupling region 100*b*, and the blocking member 600 is provided between the test article 100 and the inner surface of the body unit 200 defining the second inner space S2 and may be provided movable in a space between the third coupling region 100*c* and the fourth coupling region 100*d*.

Continuing to refer to FIGS. 6 and 7, according to the third embodiment of the present disclosure, the pipe member 300 may include a first pipe member 310, in which a first flow path U1 is formed to communicate with the first inner space S1, and a second pipe member 320, in which a second flow path U2 is formed to communicate with the second inner space S2. Thus, the gas leaking from the first coupling region 100*a* and the second coupling region 100*b* may flow in the first flow path U1 via the first inner space S1, and the gas leaking from the third coupling region 100*c* and the fourth coupling region 100*d* may flow in the second flow path U2 via the second inner space S2.

Also, according to the third embodiment of the present disclosure, a connection pipe member 700 may be further provided, which has one side connected to the first pipe member 310 and the second pipe member 320 and the other side connected to the measure member 400. Thus, the gas flowing in the first flow path U1 and the second flow path U2 may arrive at the measurement member 400 via the connection pipe member 700. That is, according to the third embodiment of the present disclosure, the first pipe member 310 and the second pipe member 320 are joined in the connection pipe member 700, and thus, when gas leakages occur from the first to fourth coupling regions 100*a*, 100*b*, 100*c*, and 100*d*, the leaking gas may be measured by one measurement member 400.

Also, according to the third embodiment of the present disclosure, the reaction member 500 described above may include a first reaction member 510 provided on the inner surface of the first pipe member 310 defining the first flow path U1 and a second reaction member 520 provided on the inner surface of the second pipe member 320 defining the second flow path U2. Thus, according to the third embodiment of the present disclosure, the gas leaking from the first coupling region 100*a* or the second coupling region 100*b* reacts with the first reaction member 510 and may change the color of the first reaction member 510, and the gas leaking from the third coupling region 100c and the fourth coupling region 100d reacts with the second reaction member 520 and may change the color of the second reaction member 520.

Meanwhile, FIG. 7 illustrates a case in which only one measurement member 400 is provided. In this case, all of the gases flowing through the first pipe member 310 and the second pipe member 320 may be measured by one measurement member 400. However, unlike that illustrated in FIG. 7, according to the third embodiment of the present disclosure, a plurality of measurement members 400 may be provided. For example, one of the plurality of measurement members 400 may be connected to the first pipe member 310, and another one of the plurality of measurement members 400 may be connected to the second pipe member 320. In this case, the gas, which leaks from the first coupling region 100a or the second coupling region 100b and flows inside the first pipe member 310, may be measured by the measurement member 400 connected to the first pipe member 310, and the gas, which leaks from the third coupling region 100c and the fourth coupling region 100d and flows inside the second pipe member 320, may be measured by the measurement member 400 connected to the second pipe member 320.

Figure 8:
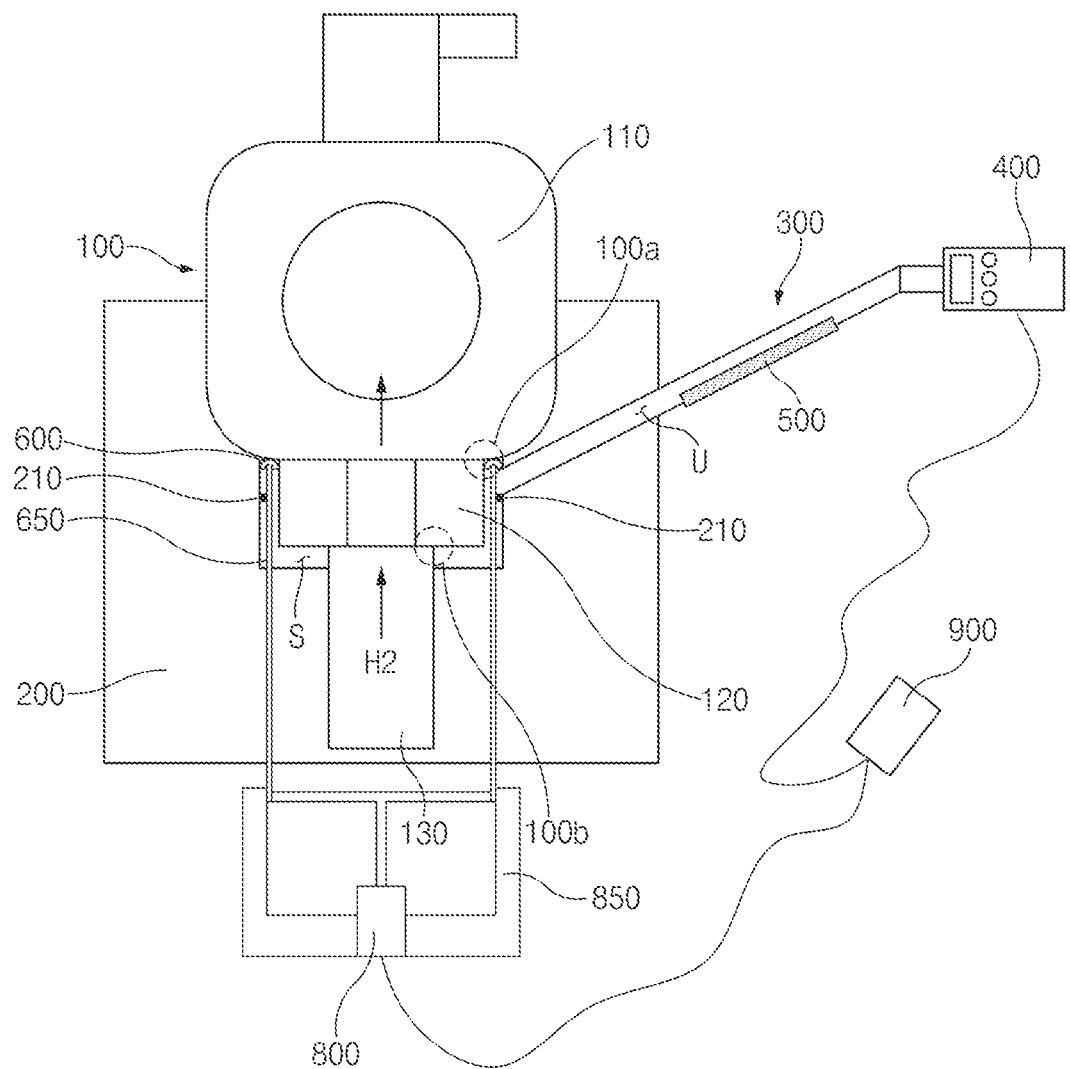
FIG. 8 is a view illustrating a gas leak detecting device according to a fourth embodiment of the present disclosure.
Figure 9:
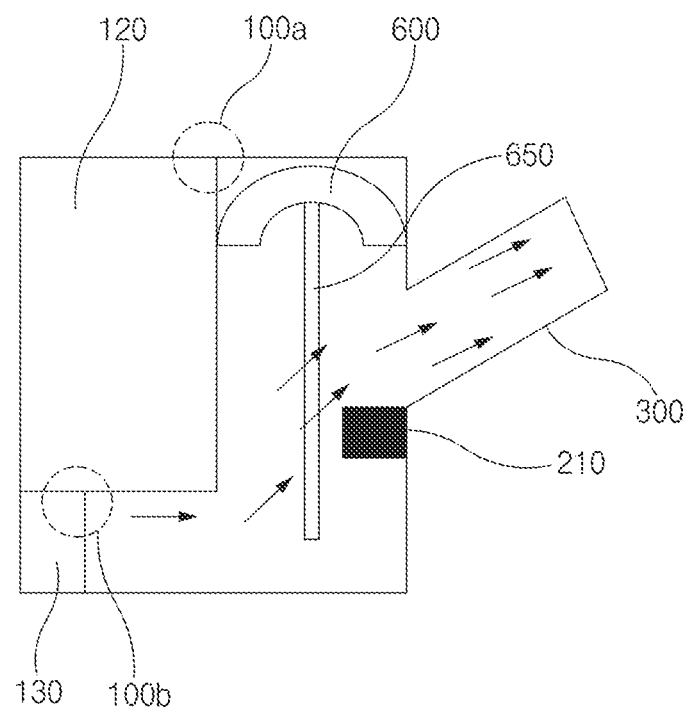
FIG. 9 is an enlarged view illustrating a state in which, as a blocking member moves upward in the gas leak detecting device according to the fourth embodiment of the present disclosure, a gas leaking from a second coupling region moves to a pipe member.
Figure 10:
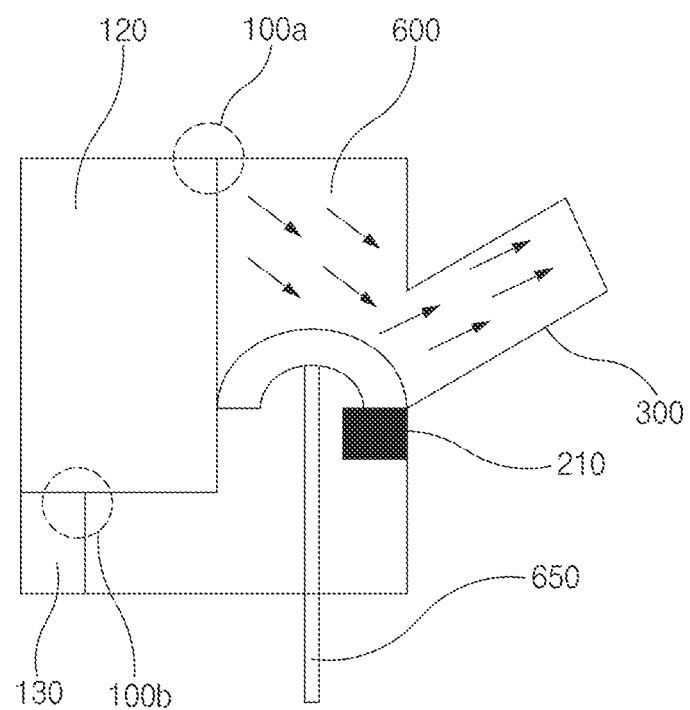
FIG. 10 is an enlarged view illustrating a state in which, as the blocking member moves downward in the gas leak detecting device according to the fourth embodiment of the present disclosure, a gas leaking from a first coupling region moves to the pipe member.

FIG. 8 is a view illustrating a gas leak detecting device according to a fourth embodiment of the present disclosure, and FIG. 9 is an enlarged view illustrating a state in which, as a blocking member moves upward in the gas leak detecting device according to the fourth embodiment of the present disclosure, a gas leaking from a second coupling region moves to a pipe member. FIG. 10 is an enlarged view illustrating a state in which, as the blocking member moves downward in the gas leak detecting device according to the fourth embodiment of the present disclosure, a gas leaking from a first coupling region moves to the pipe member. The configuration of a gas leak detecting device 10 according to the fourth embodiment of the present disclosure is the same as the configuration of the gas leak detecting device according to the second embodiment of the present disclosure, but there is a difference in that the fourth embodiment further includes an inner protrusion, a driving unit, a fixing member, and a control unit which will be described later. Therefore, in the content of the gas leak detecting device according to the fourth embodiment of the present disclosure, the content that overlaps with the gas leak detecting device according to the second embodiment of the present disclosure will be omitted.

Referring to FIGS. 8 to 10, the body unit 200 of the gas leak detecting device 10 according to the fourth embodiment of the present disclosure may further include an inner protrusion 210 which is provided on the inner surface thereof and protrudes inward. The inner protrusion 210 may be configured to limit the vertical movement of the blocking member 600. More specifically, when the blocking member 600 moves downward a certain distance, the blocking member 600 interferes with the inner protrusion 210 and cannot move further downward. In order for the blocking member 600 to interfere with the inner protrusion 210, a portion of the blocking member 600 and a portion of the inner protrusion 210 may overlap each other when the gas leak detecting device 10 is viewed from above or below.

More preferably, referring to FIGS. 9 and 10, in the inner surface of the body unit 200, the inner protrusion 210 may be provided on the inner surface positioned below the pipe member 300. In this case, when the blocking member 600 moves upward and is positioned above the pipe member 300, the gas leaking from the second coupling region 100b may arrive at the measurement member 400 via the pipe member 300. On the other hand, when the blocking member 600 moves downward to come into contact with the inner protrusion 210, the gas leaking from the first coupling region 100a may arrive at the measurement member 400 via the pipe member 300.

Continuing to refer to FIG. 8, the gas leak detecting device 10 according to the fourth embodiment of the present disclosure may further include a driving unit 800, which is connected to one side of the moving member 650 and moves the moving member 650 and the blocking member 600 in the up-down direction, and a fixing member 850, which accommodates the driving unit 800 and to which the driving unit 800 is coupled. For example, the driving unit 800 may include a motor, which provides power to move the moving member 650 and the blocking member 600 in the up-down direction, and a load sensor, which is provided on one side of the moving member 650 and measures a load applied by the moving member 650. The load sensor described above may be a load cell.

Also, the gas leak detecting device 10 according to the fourth embodiment of the present disclosure may further include a control unit 900 that controls operation of the driving unit 800. More specifically, the control unit 900 may receive, from the measurement member 400, information about whether or not a certain gas leaks and may control the operation of the driving unit 800 on the basis of this information.

The gas leak detecting device 10 according to the fourth embodiment of the present disclosure may operate as follows. First, the driving unit 800 is driven to move the moving member 650 upward, and accordingly, the blocking member 600 moves above the pipe member 300. In this case, since the second coupling region 100b communicates with the flow path U of the pipe member 300, whether or not a gas leaks from the second coupling region 100b may be detected by the measurement member 400. Subsequently, the information about whether or not a gas leaks from the second coupling region 100b may be transmitted to the control unit 900 through the measurement member 400. Next, the control unit 900 controls the motor of the driving unit 800 to move the moving member 650 downward, and accordingly, the blocking member 600 is moved below the pipe member 300. Here, the blocking member 600 moves downward to a region in which the blocking member 600 interferes with the inner protrusion 210. When the motor of the driving unit 800 continues to be driven even after the blocking member 600 interferes with the inner protrusion 210, a load is applied to the load cell inside the driving unit 800. The information about the load described above is transmitted to the control unit 900, and the control unit 900 detects that the downward movement of the blocking member 600 is completed and stops the operation of the motor of the driving unit 800. Subsequently, whether or not a gas leaks from the first coupling region 100a is measured by the measurement member 400.

Gas Leak Detecting Method

Hereinafter, referring to the above descriptions and drawings, a gas leak detecting method according to the present disclosure may include a test article preparation operation of preparing a test article 100 that includes a first coupling region 100a, in which a second component 120 is coupled to one side of a first component 110, and a second coupling region 100b, in which a third component 130 is coupled to one side of the second component 120, a test article arrangement operation of arranging the test article 100 in an inner space S of a body unit 200, and a sealing inspection operation of examining a gas discharged from the inner space S and inspecting whether or not the first coupling region 100a or the second coupling region 100b is sealed. Here, according to the present disclosure, in the sealing inspection operation, the first coupling region 100a and the second coupling region 100b may be located together inside the inner space S.

Also, a pipe member 300, in which a flow path U is formed to communicate with the inner space S, may be inserted into and fixed to the body unit 200 as described above. In the sealing inspection operation, it is inspected whether or not a gas discharged from the inner space S and flowing in the flow path U of the pipe member 300 is present.

Meanwhile, in the test article arrangement operation, the body unit 200 may be provided in close contact with the test article 100 so that the first coupling region 100a and the second coupling region 100b are sealed from the outside. In one example, the body unit 200 may include a silicone material so that the body unit 200 effectively comes into close contact with the test article 100.

More preferably, in the test article arrangement operation, a minimum cross-sectional area M2 of the flow path U of the pipe member 300 may be greater than a minimum cross-sectional area M1 of a space between the test article 100 and an inner surface of the body unit 200 defining the inner space S. In this case, when a gas leaks from the test article 100 flows in the flow path U via the inner space S, flow resistance applied to the gas may be minimized. Thus, it is possible to rapidly detect whether or not a gas leaks.

Also, according to the present disclosure, in the sealing inspection operation, whether or not the first coupling region 100a or the second coupling region 100b is sealed may be inspected by using a reaction member 500 which is provided on an inner surface of the pipe member 300 defining the flow path U and has a color that is changed when reacting with a certain gas.

Meanwhile, according to the present disclosure, in the sealing inspection operation, whether or not the first coupling region 100a is sealed may be inspected in a state in which the first coupling region 100a communicates with the flow path U while the second coupling region 100b is disconnected from the flow path U, and whether or not the second coupling region 100b is sealed may be inspected in a state in which the second coupling region 100b communicates with the flow path U while the first coupling region 100a is disconnected from the flow path U. The operation described above may be performed by moving the blocking member 600.

That is, in the sealing inspection operation, the first coupling region 100a or the second coupling region 100b may be disconnected from the flow path U by moving the blocking member 600 that is provided movable in a space between the test article 100 and the inner surface of the body unit 200 defining the inner space S.

Also, according to the present disclosure, the test article 100 may further include a third coupling region 100c, in which a fourth component 140 is coupled to one side of the first component 110, and a fourth coupling region 100d, in which a fifth component 150 is coupled to one side of the fourth component 140, and the inner space S may include a first inner space S1 and a second inner space S2 spaced apart from the first inner space S1.

Here, in the test article arrangement operation, the first coupling region 100a and the second coupling region 100b may be located in the first inner space S1, and the third coupling region 100c and the fourth coupling region 100d are located in the second inner space S2.

In addition, each of a first pipe member 310, in which a first flow path U1 is formed to communicate with the first inner space S1, and a second pipe member 320, in which a second flow path U2 is formed to communicate with the second inner space S2, may be inserted into and coupled to the body unit 200. In the sealing inspection operation, it may be inspected whether or not a gas discharged from the first inner space S1 and flowing in the first flow path U1 is present, and it may be inspected whether or not a gas discharged from the second inner space S2 and flowing in the second flow path U2 is present.

According to the present disclosure, it is possible to inspect whether hydrogen leaks from a hydrogen storage system even when the hydrogen storage system is mounted to another equipment.

Also, according to the present disclosure, it is possible to reduce the time it takes to inspect regions in a hydrogen storage system in which hydrogen is likely to leak.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

The invention claimed is:

1. A gas leak detecting method comprising:
a test article preparation operation comprising:
preparing a test article that comprises a first coupling region, in which a second component is coupled to one side of a first component; and
a test article arrangement operation of arranging the test article in an inner space of a body unit; and
a sealing inspection operation comprising:
examining a gas discharged from the inner space; and
inspecting whether the first coupling region or the second coupling region is sealed;
wherein in the test article arrangement operation, the first coupling region is located inside the inner space;
wherein a pipe member, in which a flow path is formed to communicate with the inner space, is inserted into and fixed to the body unit, and wherein the sealing inspection operation, further comprises inspecting whether a gas discharged from the inner space and flowing in the flow path is present.

2. The gas leak detecting method of claim 1, wherein the test article further comprises a second coupling region, in which a third component is coupled to one side of the second component, and wherein in the test article arrangement operation, the second coupling region is located inside the inner space.

3. The gas leak detecting method of claim 2, wherein the body unit comprises a silicone material, and
wherein in the test article arrangement operation, the body unit is provided in contact with the test article so that the first coupling region and the second coupling region are sealed from the outside.

4. The gas leak detecting method of claim 2, wherein in the test article arrangement operation, a minimum cross-sectional area of the flow path is greater than a minimum cross-sectional area of a space between the test article and an inner surface of the body unit defining the inner space.

5. The gas leak detecting method of claim 2, wherein in the sealing inspection operation, whether the first coupling region or the second coupling region is sealed is inspected by using a reaction member provided on an inner surface of the pipe member defining the flow path, wherein the reaction member changes color when reacting with a certain gas.

6. The gas leak detecting method of claim 2, wherein in the sealing inspection operation, whether the first coupling region is sealed is inspected in a state in which the first coupling region communicates with the flow path while the second coupling region is disconnected from the flow path.

7. The gas leak detecting method of claim 6, wherein in the sealing inspection operation, the second coupling region is disconnected from the flow path by moving a blocking member that is movable in a space between the test article and an inner surface of the body unit defining the inner space.

8. The gas leak detecting method of claim 2, wherein the test article further comprises a third coupling region, in which a fourth component is coupled to one side of the first component, and a fourth coupling region, in which a fifth component is coupled to one side of the fourth component, and the inner space comprises a first inner space and a second inner space spaced apart from the first inner space,
wherein in the test article arrangement operation, the first coupling region and the second coupling region are located in the first inner space, and the third coupling region and the fourth coupling region are located in the second inner space.

9. The gas leak detecting method of claim 8, wherein a first pipe member, in which a first flow path is formed to communicate with the first inner space, and a second pipe member, in which a second flow path is formed to communicate with the second inner space, are inserted into and coupled to the body unit,
wherein the sealing inspection operation further comprises inspecting whether a gas discharged from the first inner space and flowing in the first flow path is present, and inspecting whether a gas discharged from the second inner space and flowing in the second flow path is present.

10. A gas leak detecting device comprising:
a test article to be inspected for leakage of a gas, the test article comprising a first coupling region in which a second component is coupled to one side of a first component;
a body unit in which an inner space is formed to accommodate the test article; and
a measurement member configured to measure the gas;
wherein the first coupling region is located in the inner space;
further comprising a pipe member inserted into the body unit, the pipe member having the flow path communicating with the inner space, and wherein the measurement member is connected to the pipe member.

11. The gas leak detecting device of claim 10, further comprising a reaction member which is provided on an inner surface of the pipe member defining the flow path, and wherein the reaction member has changes color when reacting with a certain gas.

12. The gas leak detecting device of claim 11, wherein the test article further comprises a second coupling region in which a third component is coupled to one side of the second component;
wherein the test article further comprises a third coupling region, in which a fourth component is coupled to one side of the first component, and a fourth coupling region, in which a fifth component is coupled to one side of the fourth component, and
the inner space comprises a first inner space and a second space spaced apart from the first space,
and wherein the first coupling region and the second coupling region are located in the first inner space, and the third coupling region and the fourth coupling region are located in the second inner space.

13. The gas leak detecting device of claim 12, wherein the pipe member comprises:
a first pipe member having a first flow path configured to communicate with the first inner space; and
a second pipe member having a second flow path configured to communicate with the second inner space.

14. The gas leak detecting device of claim 13, further comprising a connection pipe member having one side connected to the first pipe member and the second pipe member, and an other side connected to the measure member.

15. The gas leak detecting device of claim 10, wherein the pipe member protrudes from the body unit.

16. A gas leak detecting device comprising:
a test article to be inspected for leakage of a gas, the test article comprising a first coupling region in which a second component is coupled to one side of a first component;
a body unit in which an inner space is formed to accommodate the test article; and
a measurement member configured to measure the gas;
wherein the first coupling region is located in the inner space; and
wherein the test article further comprises a second coupling region in which a third component is coupled to one side of the second component.

17. The gas leak detecting device of claim 16, further comprising a blocking member provided in a space between the test article and an inner surface of the body unit defining the inner space of the body unit, wherein the blocking member is movable in a space between the first coupling region and the second coupling region.

18. The gas leak detecting device of claim 17, wherein the blocking member comprises:
a convex region having a shape that is convex outward; and
a concave region on the opposite side from the convex region, the concave region having a shape that is concave toward the convex region.

19. The gas leak detecting device of claim 18, wherein the blocking member is provided such that the direction in which the convex region faces the concave region is parallel to the direction in which the first coupling region is spaced apart from the second coupling region.

20. The gas leak detecting device of claim 17, further comprising a moving member which has one side fixed to the blocking member and protrudes outward from the blocking member.

* * * * *